United States Patent [19]

Van Blanton et al.

[11] 4,224,219

[45] Sep. 23, 1980

[54] METHOD FOR PRODUCING WATER SOLUBLE CORN PROTEIN DERIVATIVES BY REACTING WITH ALKYLENE OXIDE

[75] Inventors: M. Van Blanton, Fenton; Barrett L. Scallet, Clayton, both of Mo.

[73] Assignee: Anheuser-Busch, Incorporated, St. Louis, Mo.

[21] Appl. No.: 960,843

[22] Filed: Nov. 15, 1978

[51] Int. Cl.$^2$ .............................................. A23J 0/00
[52] U.S. Cl. ............................... 260/112 G; 106/149; 260/6; 260/123
[58] Field of Search ........................... 260/123, 112 G

[56] References Cited

U.S. PATENT DOCUMENTS

| | | | |
|---|---|---|---|
| 2,401,685 | 6/1946 | Hagemeyer | 260/123 X |
| 2,461,070 | 2/1949 | McKinney | 260/112 R X |
| 2,727,027 | 12/1955 | Munson et al. | 260/123 X |
| 3,010,917 | 11/1961 | Howland | 260/123 X |
| 3,111,416 | 11/1963 | Gaver et al. | 260/112 G X |
| 3,202,748 | 8/1965 | Naka et al. | 264/194 X |
| 3,207,613 | 9/1965 | Merrill | 260/123 X |
| 3,522,197 | 7/1970 | Aranyi et al. | 260/112 R X |

*Primary Examiner*—Howard E. Schain
*Attorney, Agent, or Firm*—Gravely, Lieder & Woodruff

[57] ABSTRACT

Process for treating corn protein with an alkylene oxide to produce a corn protein derivative that is soluble in a moderately alkaline aqueous medium. The process can also be used to produce a corn protein derivative that is more soluble in 50% aqueous ethanol than in 70% aqueous ethanol. Corn protein suitable for treatment by this process is obtained directly from corn gluten or from zein.

9 Claims, No Drawings

METHOD FOR PRODUCING WATER SOLUBLE CORN PROTEIN DERIVATIVES BY REACTING WITH ALKYLENE OXIDE

BACKGROUND OF THE INVENTION

The corn kernel is composed largely of starch, fiber, fat, and protein. Most of the corn protein is contained in what is commonly referred to as the gluten fraction. Untreated corn protein has little commercial value except in animal feed. It is insoluble in water except at high pH levels (above 10.5), and is also insoluble in organic solvents, while being partially soluble in some aqueous organic solvents. These poor solubility characteristics severely limit its usefulness.

An object of this invention is to provide modified corn protein derivatives which may be cast from an aqueous solution to form a film of significant commercial value. A film cast from a highly alkaline aqueous medium (above pH of 10) is extremely friable, and thus unsuitable for the usual coating and unsupported-film uses. If an alternative solvent is used, problems involving the environment and health immediately arise.

Starting materials for the process of this invention may be commercial corn gluten, purified corn gluten, commercial zein, or purified zein.

Commercial corn gluten contains starch, fat, and fiber, in addition to protein. The most prevalent protein in corn is zein, a prolamine. The process of separating zein from the other proteins in corn is facilitated by the ability of zein to dissolve in certain solvent systems (as described below) while the fiber, starch, and the rest of the corn proteins remain as an insoluble residue.

The solvent system may comprise water and any of several alcohols, or water containing either an organic or inorganic base or a detergent. A nonpolar solvent, such as hexane, may be used to further purify the zein after solvent extraction. Such a purification step will remove fat and pigments.

SUMMARY OF THE INVENTION

This invention involves a process for treating corn gluten, zein or any other protein derived from corn with an alkylene oxide, such as ethylene oxide or propylene oxide, to produce corn protein derivatives that are soluble in a moderately alkaline aqueous medium and in aqueous ethanol. The corn protein derivatives produced by this process are commercially useful as films or coatings.

DETAILED DESCRIPTION

Commercial zein, commercial gluten, purified zein, a purified gluten, or an extract from any of the foregoing, is dissolved in a water miscible solvent. The preferred solvent is a 5% to 15% aqueous solution of triethylamine. Other suitable solvents are aqueous solutions of ethanol, propanol, isopropanol, and trimethylamine. The solution is maintained at a temperature below about 25° C. From about 5% to about 25% alkylene oxide, based on the weight of the zein, is added to the foregoing solution and the resulting mixture is allowed to react for about 24 hours at room temperature (25° C.).

The final product can be recovered by any one of the following methods:
(1) Dialysis against water followed by lyophilization;
(2) Acid precipitation followed by lyophilization;
(3) Direct lyophilization of the reaction mixture.

The final product is soluble in water at a pH above about 9.0 to a pH slightly above about 9.5 at concentrations up to about 25%.

Untreated corn protein is insoluble in water up to a pH of about 10.5.

EXAMPLE 1

50 g of commercial zein were dissolved in 200 g of 10% triethylamine. 5 g of propylene oxide were added at 15° C. The propylene oxide was allowed to react with the zein for 24 hours at 25° C.

The reaction mixture was then dialyzed and lyophilized.

The recovered dry material was soluble in water at concentrations of up to 20% (w/w) and at a pH of slightly above about 9.0.

EXAMPLE 2

50 g of commercial zein were dissolved in 200 g of 10% triethylamine. 5 g of ethylene oxide were added at 15° C. The ethylene oxide and zein were allowed to react for 24 hours at 25° C.

Upon completion of the reaction, the reaction mixture was diluted with water, and cooled. The proteinaceous material was precipitated by adding dilute hydrochloric acid.

The precipitate was washed 3 times, the wash water was decanted, and the reaction mixture was lyophilized.

The dry material was soluble in water at concentrations of up to 15% (w/w) and at a pH of slightly above about 9.0.

EXAMPLE 3

50 g of dry neutral corn gluten was dissolved in 300 g of 10% triethylamine. To this solution was added 7.5 g of propylene oxide.

The reaction of the gluten with the propylene oxide was conducted at room temperature (25° C.) for about 72 hours.

The reaction mixture was dialyzed, and then centrifuged to remove insoluble material.

The clarified dialyzate was stirred with an equal volume of hexane for 2 hours. The mixture was then placed in a separating funnel and allowed to stand for 16 hours.

The aqueous layer was removed and lyophilized.

The recovered dry material was soluble in water at concentrations of up to 25% and at a pH of slightly above about 9.5.

EXAMPLE 4

250 g of gluten was extracted for one hour at 45° C. with a mixture containing 245 ml of isopropanol, 292.75 ml of water, and 17.5 ml of a 30% aqueous solution of sodium hydroxide.

The mixture was centrifuged for one hour at 2000 RPM. About 500 ml of supernate was obtained.

The clarified extract was divided into two 250 ml portions and each was cooled to 5° C.

To one portion was added 5.2 g of liquid ethylene oxide. To the other portion was added 15.6 g of liquid ethylene oxide.

The reaction vessels were sealed and each reaction mixture was stirred for one hour at 5° C. The temperature was then raised gradually to 45° C. Stirring was continued for a total of 24 hours.

After the completion of the reaction, the pH of each mixture was adjusted to about 10 and the liquids were centrifuged to remove insoluble material. The clarified reaction mixtures were precipitated, decolorized, and dehydrated with acetone.

The derivatives resulting from each portion were soluble in water at concentrations of up to 20% at a pH level of about 9.5.

The derivatives were also soluble at concentrations of up to 20% (w/w) in 50% aqueous ethanol, but were only partially soluble in 70% aqueous ethanol.

In order to evaluate the film forming properties of the corn protein-alkylene oxide derivatives, the following procedure was used. An aqueous solution of the protein derivative was prepared and spread on glass using a Bird applicator. The resulting film was then observed in order to compare its transparency, solubility, and flexibility properties with the corresponding properties of an untreated corn protein. In all cases, the corn protein derivatives had superior properties. The films could be rendered insoluble by incorporating ketone-aldehyde, or other alkaline curing resins, into the initial solution and drying the resulting film in a forced air oven for 30 minutes at 110° C.

What is claimed is:

1. A process for producing a corn protein derivative that is soluble in an aqueous medium having a pH of about 9 to about 9.5 comprising the steps of:
   A. dissolving a corn protein fraction selected from the group consisting of commercial corn gluten, purified corn gluten, commercial zein, and purified zein in water containing an alcohol or either an organic or inorganic base,
   B. reacting the dissolved corn protein fraction with an alkylene oxide selected from the group consisting of ethylene oxide, propylene oxide and mixtures of ethylene oxide and propylene oxide, and
   C. recovering the resulting corn protein derivative.

2. The process of claim 1 wherein the aqueous solution also contains ethanol, propanol, isopropanol, trimethylamine, triethylamine, or mixtures of the aforementioned.

3. The process of claim 1 wherein the aqueous solution contains from about 5% to about 15% triethylamine by volume.

4. The process of claim 3 wherein the aqueous solution is maintained at a temperature of about 10° to about 35° C.

5. The process of claim 1 wherein about 10% to about 75% by weight ethylene oxide based on the weight of corn protein is used.

6. The process of claim 1 wherein about 10% to about 25% by weight propylene oxide based on the weight of corn protein is used.

7. The process of claim 1 wherein recovery is carried out by dialysis and lyophilization.

8. The process of claim 1 wherein recovery is carried out by acid precipitation and lyophilization.

9. The process of claim 1 wherein recovery is carried out by direct lyophilization.

* * * * *